Nov. 25, 1958  E. J. SMITH  2,862,180
TRANSIENT ANALYZER FOR MAGNETIC AMPLIFIERS
Filed June 30, 1954  3 Sheets-Sheet 1

DETERMINATION OF TRANSIENT RESPONSE
OF MAGNETIC AMPLIFIER

INVENTOR.
EDWARD J. SMITH
BY
Roderick B. Jones
ATTORNEYS

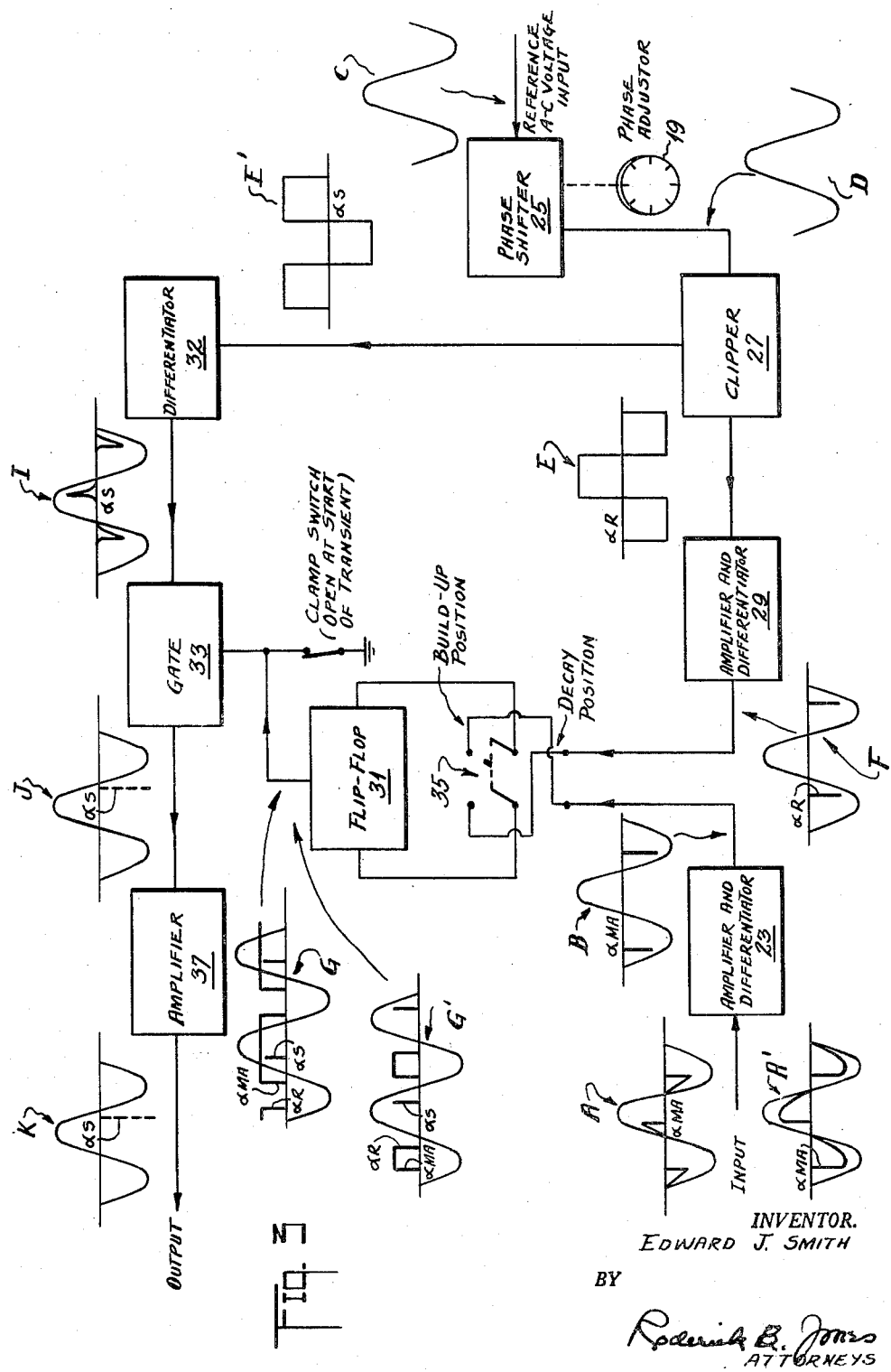

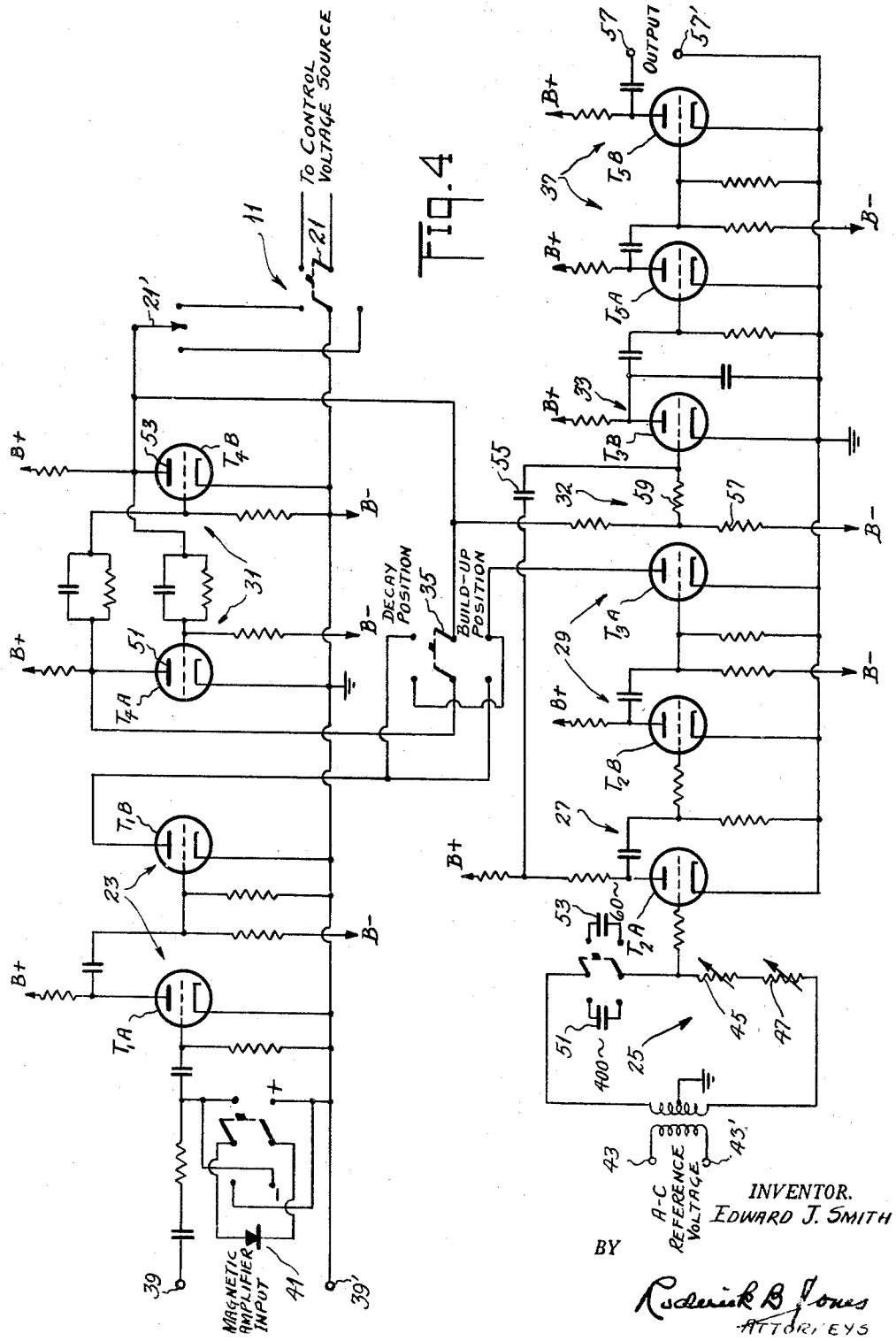

United States Patent Office 2,862,180
Patented Nov. 25, 1958

2,862,180

TRANSIENT ANALYZER FOR MAGNETIC AMPLIFIERS

Edward J. Smith, Brooklyn, N. Y., assignor, by mesne assignments, to the United States of America as represented by the Secretary of the Navy Application June 30, 1954, Serial No. 440,576

5 Claims. (Cl. 324—57)

This invention relates to electronic mensuration and more particularly to a simple method and apparatus for measuring the transient response of magnetic amplifiers.

The response time of magnetic amplifiers may be defined as the time required for the root-mean-square (R. M. S.) or rectified average value of output current or voltage to change a prescribed percentage of the difference between the corresponding initial and final steady state values. When the magnetic characteristics of core materials approach the rectangular B—H curve or loop shape, the wave form of the output current exhibits the typical rapid rise as one core saturates at some angle $\alpha_{MA}$ and sinusoidal form after saturation, until the end of the half cycle. Under such conditions, the peak value of the load current is independent of the average or R. M. S. value when $$\alpha_{MA} \leq \frac{\pi}{2}$$

Conventional recording instruments are suitable for the measurement of cyclic peak values and can be adapted to measure R. M. S. or average value response time but at the expense of considerable inconvenience and difficulty. Electronic cyclic integrators can be devised for direct measurement of the rectified average values of the output taken over each cycle by portraying the response of the amplifier in terms of cyclic average values on the screen of a cathode ray oscilloscope from which the response time is determined.

An object of the present invention is to provide a method and apparatus for measuring the transient response of a magnetic amplifier that will overcome the disadvantages mentioned hereinbefore.

Another object is to provide a device for generating a number of pulses exactly equal to the number of cycles required for the output current or voltage of a magnetic amplifier to change from its initial value to any arbitrary or predetermined value.

Other objects and many of the attendant advantages of this invention will be readily appreciated as the same becomes better understood by reference to the following detailed description when considered in connection with the accompanying drawings wherein:

Fig. 3 is a block diagram of the transient analyzer of Fig. 1 showing the pulse shapes at various junction points.

Fig. 4 is a schematic wiring diagram of a preferred embodiment of the transient amplifier of Fig. 3.

Figure 1:
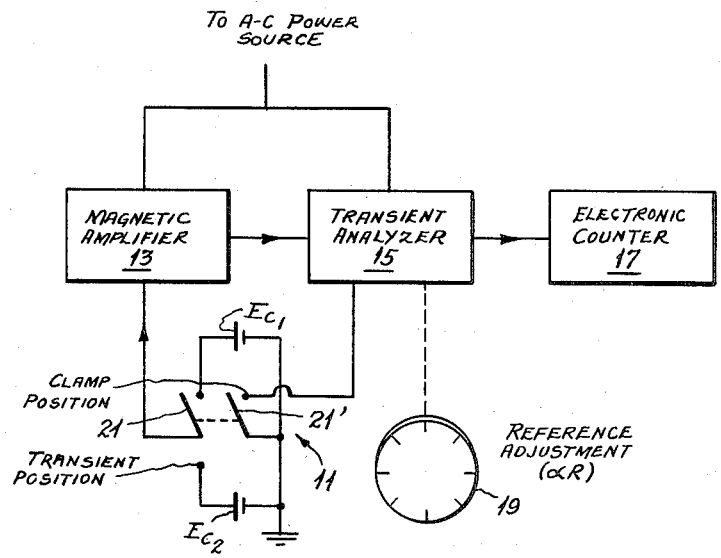
Fig. 1 is a block diagram of the essential apparatus for measuring the transient response of a magnetic amplifier.

In Fig. 1, there is shown a control circuit 11 comprising batteries $E_{c1}$ and $E_{c2}$ and two switches ganged together shown in clamp position, a magnetic amplifier 13, a transient analyzer 15 and an electronic counter 17 connected together. The values of the control circuit voltages $E_{c1}$ and $E_{c2}$ (or current) corresponding to the desired initial and final steady state values of load voltage (or current) are established. Output of magnetic amplifier 13 is then set at a reference value (i. e. 63.90 percent, etc. of the total change-response time) by applying a suitable signal to the control circuit. Magnetic amplifier 13 saturates at some angle corresponding to the reference value of output such that:

$$\alpha_{MA} = \alpha_R$$

where $\alpha_{MA}$ is the angle of saturation of magnetic amplifier 13 and $\alpha_R$ is designated the reference angle. If the core materials of magnetic amplifier 13 are not "ideal," the current wave will not jump abruptly at saturation, however, if $\alpha_{MA}$ is taken as the angle of maximum slope of the wave, the operation is the same as though the core materials were rectangular.

Transient analyzer 15 is designed to generate a voltage pulse of very short duration once every cycle. The phase of this reference pulse is then made to coincide with reference angle $\alpha_R$ by a manual adjustment of phase adjust knob 19. When the output current is less than the reference value $$\alpha_{MA} > \alpha_R$$

and, when the output current is greater than the reference value $$\alpha_{MA} < \alpha_R$$

It is to be observed that although the above remarks apply to a single-ended magnetic amplifier, the method described can be applied to a push-pull magnetic amplifier by comparing the saturation angle of one reactor with the reference angle.

The function of transient analyzer 15 is to compare the angles $\alpha_{MA}$ and $\alpha_R$ every cycle and indicate the result by generating an output pulse every cycle for a build-up transient when $\alpha_{MA} > \alpha_R$, no pulse being generated when $\alpha_{MA} < \alpha_R$; and by generating a pulse every cycle for a decay transient if $\alpha_{MA} < \alpha_R$, no pulse being generated when $\alpha_{MA} > \alpha_R$. Analyzer 15 becomes operative only after switches 21 and 21' initiating the transient and unclamping the analyzer, respectively, are thrown to lower position. Thus, the number of pulses generated by analyzer 15 after the switches are thrown is equal to the number of cycles required for the output of the amplifier to change from the initial value to the reference value. The response time of said amplifier is obtained directly by counting the number of pulses generated by analyzer 15 during the transient. Counting can be accomplished with electronic counters of the conventional type such as multiple decade counters (having Eccles-Jordan flip-flop circuits) used in electronic digital computers. Standard recording oscillographs can also be used for counting.

Figure 2:
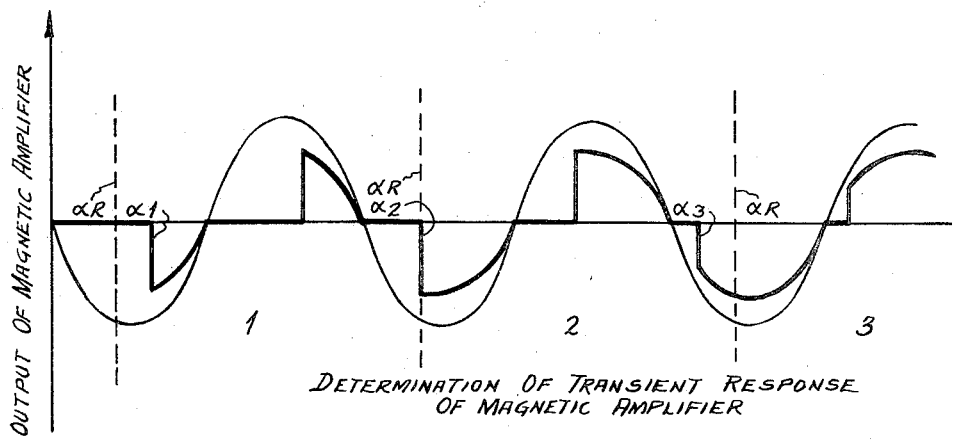
Fig. 2 is a graphical representation of the invention of Fig. 1 showing a plot of the output of the magnetic amplifier over several cycles with the reference angles superimposed thereon for a build-up transient.

The comparison of angles $\alpha_{MA}$ and $\alpha_R$ is made during one half of the cycle, the negative half (see Fig. 2). If the output of magnetic amplifier 13 is A.-C. as shown in Fig. 2, the signal into analyzer 15 can be obtained from the load (i. e. load voltage). If the signal is full-wave D.-C. (rectified D.-C.) then the signal to analyzer 15 must be taken as the voltage across one reactor winding. In any event whether full-wave A.-C. or D.-C., half-wave or push-pull A.-C. or D.-C., the signal can always be taken from a winding of one reactor. This will be obvious from the fact that the analyzer operates by comparing the reference pulse with some negative pulse derived from the magnetic amplifier which occurs only once during a cycle.

The phase angle of reference pulse $\alpha_R$ is readily adjusted without the aid of an oscillator by setting the output of magnetic amplifier at the reference value. This is accomplished by applying an appropriate steady state control signal to the amplifier and observing the output with a suitable A.-C. or D.-C. meter. The transient analyzer is unclamped and the phase adjustment 19 varied until pulses are obtained from the output terminals. The phase adjustment is further varied until the output from analyzer 15 just ceases. Reference angle $\alpha_R$ is now adjusted (i. e., $\alpha_{MA}=\alpha_R$ for the desired, or reference, value of the output from the magnetic amplifier). Analyzer 15 is again clamped, the counter reset to zero, and the transient initiated by throwing switches 21 and 21'. At the completion of the transient, the reading of counter 17 is equal to the response time in cycles of amplifier 13.

Operation of transient amplifier 15 can best be understood by reference to Figs. 3 and 4. An input signal A or A' from a magnetic amplifier 13 is applied to terminals 39—39' of said amplifier. The negative half cycle of signal A is removed by passing said signal through crystal diode 41 if the negative drop in the signal occurs on the positive half cycle (input from a reactor winding) and the positive half cycle is removed if the negative drop occurs during the negative half cycle. The clipped signal is then amplified and differentiated by feeding the signal into amplifier and differentiator stage 23, tubes $T_{1A}$ and $T_{1B}$, resulting in a sharp negative pulse B of short duration which occurs at phase angle $\alpha_{MA}$. An A.-C. voltage C having the same frequency as the magnetic supply voltage is impressed on terminals 43—43' and passed to a phase-shifter stage 25 which is equipped with coarse and fine adjustments for varying the phase. Said stage 25 consists of potentiometers 45 and 47 in series with capacitor 51 or 53 depending on whether 60 or 400 cycles per second (C. P. S.) operation is utilized. The phase-shifted A.-C. wave D is then passed through clipper stage 27, tube $T_{2A}$, resulting in negative wave form E. Said clipped wave E is then passed into an amplifier and differentiator stage 29, tubes $T_{2B}$ and $T_{3A}$ where a sharp negative pulse of short duration is derived. Pulse F is the reference pulse. The phase of reference angle $\alpha_R$ is determined by the aforementioned phase adjustments. From clipper stage 27 there is also fed to differentiator stage 32 a positive wave form E' having a phase angle $\alpha_S$, where $\alpha_S = \alpha_R + \pi$.

Pulses B and F derived from amplifier and differentiator stages 23 and 29 respectively are fed through switch 35 into opposite plates 51 and 53 of a conventional Eccles-Jordan flip-flop stage 31, tubes $T_{4A}$ and $T_{4B}$, the operation of which is such that a negative pulse received at plate 51 triggers the stage causing its plate voltage to drop to its "low" value and the voltage of plate 53 to rise to its "high" value. Said circuit 31 remains in this condition until a negative pulse is received on plate 53, at which time the plate values of tubes $T_{4A}$ and $T_{4B}$ reverse.

The voltage G or G' appearing on either plate 51 or 53 of flip-flop stage 31 is used to control a gate stage 33, tube $T_{3B}$. When plate 51 or 53 is "high" gate 33 is open and a signal I which is derived from differentiator stage 32 consisting of condenser 55 and resistors 57 and 59 is passed therethrough. When plate 51 or 53 is "low" gate 33 is closed and incoming signal I is blocked. It is to be observed that the two input connections to flip-flop circuit 31 are interchanged for build-up and decay transients in switch 35. For a build-up transient, the pulse B derived from magnetic amplifier 13 is connected to flip-flop stage 31 in such direction as to open gate 33, and reference pulse F is connected in such direction as to close the gate. The signal input I to gate 33 is called the "sensing" pulse and occurs at angle $\alpha_S$, where as mentioned hereinbefore $\alpha_S = \alpha_R + \pi$. It follows that if pulse B occurs after pulse F (where $\alpha_{MA} > \alpha_R$), gate 33 will open when said sensing pulse I arrives at the input to said gate. Therefore, a pulse J is fed from gate 33 to an amplifier stage 37, tubes $T_{3A}$ and $T_{3B}$, and an output pulse K appears across output terminals 57 and 57'. On the other hand, during a build-up transient, if pulse F occurs after pulse B (where $\alpha_{MA} < \alpha_R$), gate 33 will remain closed when sensing pulse I arrives at the input to said gate and no pulse appears at output terminals 57—57'. For a decay transient, the rules of pulses B and F are interchanged by throwing reversing switch 35 to the decay position. Operation of transient analyzer 15 then proceeds as described hereinbefore.

The specific embodiment shown in Fig. 4 is designed for 60 and 400 cycles per second operation but can be easily modified for higher frequency applications. In operation, analyzer sensitivity was found to be sufficient for satisfactory operation on signals obtained from typical 10 volt, 60 C. P. S., half-wave and full-wave magnetic amplifiers employing Mumetal and Hipernik V core materials. For smaller signals, an additional stage of pre-amplification is required.

The logic of the circuit operation requires that the input from the magnetic amplifier be sufficient to trigger flip-flop stage 31 for all values of $\alpha_{MA}$ realized during the transient. Accuracy of the transient analyzer is high because of the dependence only upon the setting the reference angle $\alpha_R$.

It is seen from the apparatus and method described hereinbefore that a simple and reliable electronic device is provided that operates by generating a number of pulses exactly equal to the number of cycles required for the output current or voltage of a magnetic amplifier to change from its initial value to a predetermined value. The response time in cycles is obtained directly by recording the output of the analyzer with an electronic counter or conventional recording devices.

Obviously many modifications and variations of the present invention are possible in the light of the above teachings. It is therefore to be understood that within the scope of the appended claims the invention may be practiced otherwise than as specifically described.

What is claimed:

1. Apparatus for measuring the response time of a magnetic amplifier comprising means for accepting an output from such magnetic amplifier, means for transforming said output into a sharp negative pulse of short duration coincident with the saturation angle of such magnetic amplifier, means for accepting an adjustable phase A.-C. reference voltage and for shifting the phase thereof, means for transforming said reference voltage to a sharp negative pulse of short duration and means for cyclically comparing said two pulses during the transient of such magnetic amplifier.

2. Apparatus for measuring the response time of a magnetic amplifier comprising an amplifier for accepting an output from such magnetic amplifier, a differentiating circuit connected to said amplifier for producing a sharp negative pulse of short duration coincident with the saturation angle of such magnetic amplifier, a phase-shifting circuit for accepting an adjustable phase A.-C. reference voltage, differentiating circuit means connected to said phase-shifting circuit for producing a sharp negative pulse of short duration, a flip-flop trigger circuit connected to said first differentiating circuit and said differentiating circuit means, and gating circuit means connected to said flip-flop circuit and to said differentating circuit means for comparing cyclically the phase of said reference and saturation angle pulses, whereby an output pulse is produced only each cycle for which the reference angle of said reference pulse is greater than the angle of saturation of such magnetic amplifier.

3. Apparatus for measuring the response time of a magnetic amplifier comprising an amplifier for accepting the output from such magnetic amplifier, a first differentiating circuit connected to said amplifier for producing a sharp negative pulse of short duration coincident with the saturation angle of such magnetic amplifier, a phase shifting circuit for accepting and varying the phase of an adjustable phase A.-C. reference voltage, a second differentiating circuit connected to said phase-shifting circuit for producing a sharp negative pulse of short duration, a flip-flop trigger circuit connected to said first and second differentiating circuits, a gating circuit connected to said flip-flop circuit for comparing cyclically the phase of said reference and saturation pulses, whereby an output pulse is produced only each cycle for which the reference angle of said reference pulse is less than the angle of saturation of such magnetic amplifier.

4. A transient analyzer for determining the number of cycles required by a magnetic amplifier to respond to a cyclic input signal comprising, in combination: connections for a source of reference alternating-current signals, said reference signal being applied to said magnetic amplifier as an input signal; means for producing one pulse per cycle of the output signal from said magnetic amplifier at a time after the start of said reference signal cycle when the input signal causes said magnetic amplifier to saturate; means for shifting the phase of said reference signal; means for producing one pulse per cycle of said phase-shifted reference signal at a predetermined time after the start of said reference signal cycle; means for producing a second pulse per cycle of said phase-shifted reference signal, said second phase-shifted pulse lagging 180 electrical degrees behind the first phase-shifted pulse; means for producing a gating signal from said magnetic-amplifier output-signal pulse and said first phase-shifted pulse; gating means, said gating signal and said second phase-shifted pulse being applied thereto, said second phase-shifted pulse being passed therethrough only when said gating means is enabled by application thereto of a gating signal which is of a type that is initiated by said magnetic-amplifier output-signal pulse and cut off by said first phase-shifted pulse; and means for determining the number of said second phase-shifted pulses passing through said gating means.

5. A transient analyzer for determining the number of cycles required by a magnetic amplifier to respond to a cyclic input signal, the time of response of said amplifier being arbitrarily defined as the time required for the amplifier output to attain a predetermined condition, comprising, in combination: connections for a source of reference alternating-current signals, said reference signal being applied to said magnetic amplifier as an input signal; means for producing one pulse per cycle of the output signal from said magnetic amplifier at a time $t_{MA}$ after the start of said reference-signal cycle when the input signal causes said magnetic amplifier to saturate; means for shifting the phase of said reference signal; means for producing one pulse per cycle of said phase-shifted reference signal at a time $t_R$ after the start of said reference signal; means for producing a second pulse per cycle of said phase-shifted reference signal, said second phase-shifted pulse lagging 180 electrical degrees behind the first phase-shifted pulse; means for producing a gating signal from said magnetic-amplifier output-signal pulse and said first phase-shifted pulse; gating means, said gating signal and said second phase-shifted pulse being applied thereto, said second phase-shifted pulse being passed therethrough only when said gating means is enabled by application thereto of a gating signal which is of a type that is initiated by said magnetic-amplifier output-signal pulse and cut off by said first phase-shifted pulse, said gating signal being of the aforesaid type only as long as said time $t_{MA}$ remains longer than said time $t_R$; and means for determining the number of said second phase-shifted pulses passing through said gating means.

References Cited in the file of this patent

UNITED STATES PATENTS

| 2,370,692 | Shepherd | Mar. 6, 1945 |
| 2,517,977 | Cole et al. | Aug. 8, 1950 |
| 2,601,491 | Baker | June 24, 1952 |
| 2,666,325 | Withers et al. | Jan. 19, 1954 |
| 2,777,098 | Duffing et al. | Jan. 8, 1957 |

OTHER REFERENCES

Geyger: "Electronics," July 1953, pages 189–191.